US008238338B2

(12) United States Patent
Swallow et al.

(10) Patent No.: US 8,238,338 B2
(45) Date of Patent: Aug. 7, 2012

(54) INTERIOR GATEWAY PROTOCOL SUMMARIZATION PRESERVING INTERNET PROTOCOL REACHABILITY INFORMATION

(75) Inventors: George L. Swallow, Boston, MA (US); Clarence Filsfils, Brussels (BE); James N. Guichard, New Boston, NH (US)

(73) Assignee: Cisco Technology, Inc., San Jose, CA (US)

( * ) Notice: Subject to any disclaimer, the term of this patent is extended or adjusted under 35 U.S.C. 154(b) by 453 days.

(21) Appl. No.: 12/111,336

(22) Filed: Apr. 29, 2008

(65) Prior Publication Data
US 2009/0073996 A1    Mar. 19, 2009

Related U.S. Application Data (60) Provisional application No. 60/972,659, filed on Sep. 14, 2007.

(51) Int. Cl.
 *H04L 12/28* (2006.01)
 *H04L 12/56* (2006.01)
(52) U.S. Cl. ......................... 370/392; 370/401
(58) Field of Classification Search .................. None
 See application file for complete search history.

(56) References Cited

U.S. PATENT DOCUMENTS

| 6,651,246 | B1* | 11/2003 | Archambault et al. ....... 717/160 |
| 7,391,730 | B1* | 6/2008 | Chandra et al. ................ 370/236 |
| 7,529,192 | B2* | 5/2009 | Labovitz ....................... 370/236 |
| 7,554,996 | B2* | 6/2009 | Previdi et al. ................. 370/401 |
| 7,756,017 | B2* | 7/2010 | Goyal et al. ................... 370/225 |
| 7,831,733 | B2* | 11/2010 | Sultan et al. .................. 709/238 |
| 2003/0016678 | A1* | 1/2003 | Maeno ........................... 370/400 |
| 2003/0072485 | A1* | 4/2003 | Guerin et al. ................. 382/166 |
| 2003/0189898 | A1* | 10/2003 | Frick et al. .................... 370/227 |
| 2003/0193890 | A1* | 10/2003 | Tsillas et al. .................. 370/216 |
| 2004/0085961 | A1* | 5/2004 | Coffell et al. ................. 370/392 |
| 2006/0056328 | A1* | 3/2006 | Lehane et al. ................ 370/315 |
| 2007/0162614 | A1* | 7/2007 | Patel et al. .................... 709/239 |
| 2008/0062986 | A1* | 3/2008 | Shand et al. .................. 370/392 |
| 2008/0101392 | A1* | 5/2008 | Zhang et al. .................. 370/401 |
| 2009/0073994 | A1* | 3/2009 | Qureshi et al. ............... 370/401 |
| 2009/0161531 | A1* | 6/2009 | Chen ............................. 370/216 |

OTHER PUBLICATIONS

J. Moy, "OSPF Version 2", RFC 2328, Apr. 1998, entire document.*
R. Coltun, S. Systems, D. Ferguson, J. Moy, "OSPF for IPv6", RFC 2740, Dec. 1999, entire document.*
T. Bates, Y. Rekhter, R. Chandra, D. Katz, "Multiprotocol Extensions for BGP-4", RFC 2858, Jun. 2000, entire document.*
Decraene, B. , et al., "LPD Extension for Inter-Area LSP", Network Working Group, Internet Draft, draft-decraene-mpls-ldp-interarea-04.txt, (Mar. 2007) 10 p.

* cited by examiner

*Primary Examiner* — Chirag Shah
*Assistant Examiner* — Suk Jin Kang
(74) *Attorney, Agent, or Firm* — Schwegman, Lundberg & Woessner, P.A.

(57) ABSTRACT

In one example embodiment, a system and method is illustrated that includes receiving connectivity data for at least one network device, the connectivity data describing a connection to the at least one network device within an area. The system and method further includes processing the connectivity data to obtain a routing update for distribution to another network device outside the area. Additionally, the system and method includes a routing summary in the routing update, the routing summary including an address prefix. Further, the system and method includes reachability information in the routing update, the reachability information including an address for the at least one network device.

23 Claims, 10 Drawing Sheets

INTERIOR GATEWAY PROTOCOL SUMMARIZATION PRESERVING INTERNET PROTOCOL REACHABILITY INFORMATION

CROSS REFERENCE TO RELATED APPLICATIONS

This is a non-provisional patent application claiming priority under 35 USC §119(e) to U.S. Provisional Patent Application No. 60/972,659 filed on Sep. 14, 2007 entitled "IGP SUMMARIZATION PRESERVING IP REACHABILITY INFORMATION" which is incorporated by reference in its entirety.

FIELD

This application relates to a system and method for transmitting link data among nodes in a network.

BACKGROUND

An Interior Gateway Protocol (IGP) is a routing protocol that is used within an Autonomous System (AS). In contrast to an Exterior Gateway Protocol (EGP), which may be used for determining network reachability between ASs, IGPs may be used to resolve routes within an AS. Some well known IGPs include link-state routing protocols such as the Open Shortest Path First (OSPF) protocol and the Intermediate System to Intermediate System (IS-IS) protocol. Further, some known EGPs include, for example, Border Gateway Protocol (BGP). In certain cases, data transferred using an IGP may have uses within the context of the BGP.

BRIEF DESCRIPTION OF DRAWINGS

The presently shown system and method is illustrated by way of example and not limitation in the figures of the accompanying drawings, in which like references indicate similar elements and in which.

DESCRIPTION OF EXAMPLE EMBODIMENTS

Overview

In one example embodiment, a system and method is illustrated that includes receiving connectivity data for at least one network device, the connectivity data describing a connection to the at least one network device within an area. The system and method further includes processing the connectivity data to obtain a routing update for distribution to another network device outside the area. Additionally, the system and method includes a routing summary in the routing update, the routing summary including an address prefix. Further, the system and method includes reachability information in the routing update, the reachability information including an address for the at least one network device.

In the following description, for purposes of explanation, numerous specific details are set forth in order to provide a thorough understanding of an embodiment of the present invention. It may be evident, however, to one skilled in the art that the present system and method may be practiced without these specific details.

Figure 1:
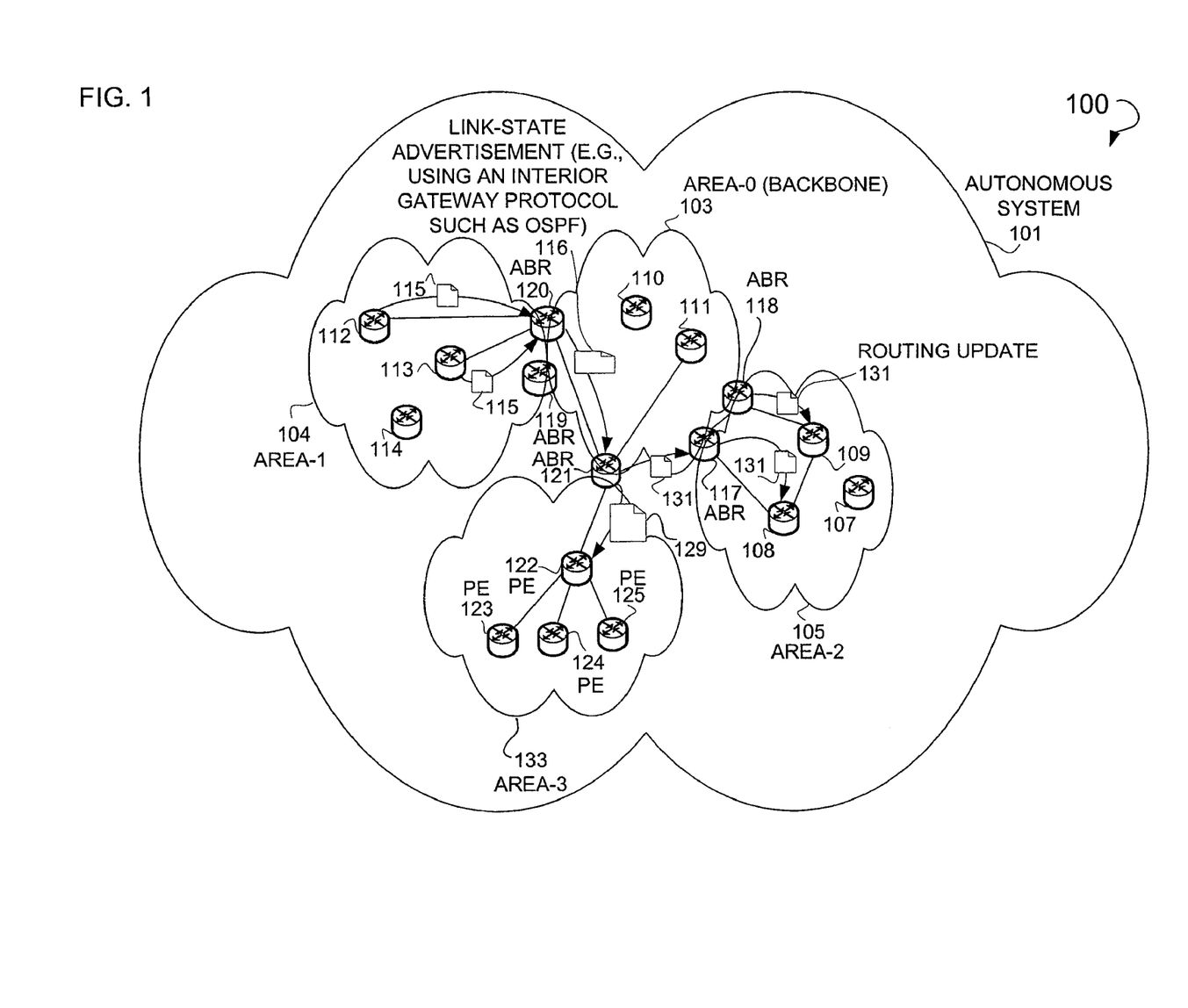
FIG. 1 is a diagram of a network, in accordance with an example embodiment, including multiple areas within an AS, one of which utilizes OSPF protocol.

FIG. 1 is a diagram of an example network 100 including AS 101, which utilizes OSPF. Included within the AS are a number of areas. An area may be those defined under an IGP such as the OSPF protocol. For example, illustrated is an AS 101 including an Area-0 103 that serves as a backbone for Area-1 104, Area-2 105, and an Area-3 133. Each of these areas includes a number of nodes (e.g., routers). Within Area-1 104 are routers 112 and 113 that are connected via physical or logical links to ABR 120. Also shown is an ABR 119. An inactive router 114 is also shown that has no physical or logic link to the other routers in the Area-1 104. Also shown is an inactive router 107 that has no physical or logic link to the other routers in the Area-2 105.

In some example embodiments, ABRs 120 and 119 obtain link-state data from routers included within the area that they serve, which in this example is Area-1 104. Link-state data may be data illustrating the existence or non-existence of connectivity (e.g., which network devices are connected to each other) between network devices within an area. The existence of, for example, a logical or physical link between network devices may be expressed as connectivity data. This link-state data may be used to generate a map of network devices within an area.

In some example embodiments, network device may be a device capable of analyzing a network layer as understood in the Transmission Control Protocol/Internet Protocol (TCP/IP) stack model, or the Open Systems Interconnection (OSI) basic reference model. For example, a network device may be a router, switch or bridge. A router may be an ABR, Provider Edge (PE), level-1 router, level-1-2 router, level-2 router, or some other suitable router.

In some example embodiments, this link-state data, such as link-state data 115, may be transmitted by, for example, a router 112 or a router 113. The ABR 120 may utilize an IGP to transmit routing summary data to, for example, an ABR 121. As shown here, for example, an LSA 116 is transmitted from the ABR 120 to the ABR 121. This LSA 116 includes both routing summary and reachability information. In some example embodiments, a routing summary is an address prefix corresponding to a common address prefix shared by one or more network devices. Additionally, the reachability information denotes the existence or non-existence of a path to at least one node within a particular domain (e.g., an area), the at least one node represented as an address within the particular domain. The ABR 121 may be linked to another router, such as router 111, wherein the ABR 121 and router 111 reside as part of the Area-0 103. Also shown is an inactive router 110 that is not linked or otherwise connected to the ABR 121 or any other router included within the Area-0 103. This router 110 may be considered to be isolated, and hence unreachable by any router included within the Area-0 103. In some example cases, the ABR 120 may, in effect, flood Area-0 103 with the LSA 116 or a plurality of LSAs 116 using the various physical or logical links.

Shown is an example ABR 117 and an ABR 118 that allow for data to pass between the Area-0 103 to the Area-2 105. This data may be, for example, a routing update 131 that may include routing summary information and reachability information taken from the LSA 116. A routing update 131 may be a message transmitted across a network, where the message instructs the recipient device as to which nodes in an area are active, or even, in some cases, which nodes are inactive. This routing update 131 may be transmitted to the router 109 by the ABR 118, or, for example, may be transmitted by the ABR 117 to the router 108. In some example cases, the ABR 118 and ABR 117 may, in effect, flood Area-2 105 with the routing update 131, or a plurality of routing updates 131, using the various physical or logical links.

In some example embodiments, upon receiving the LSA 116, the ABR 121 may update its Routing Information Base (RIB) and Forwarding Information Base (FIB) to reflect information extracted from the LSA 116. This information may include the routing summary information and reachability information provided by the LSA 116. For example, this information may indicate that router 114 is isolated. In particular, ABR 121 may use the summarized information to update its FIB, while passing an indication that router 114 is inactive to other control plane entities including, possibly, Label Distribution Protocol (LDP), Resource Reservation Protocol-Traffic Engineered (RSVP-TE), Protocol Independent Multicast (PIM), and BGP. This information may then be sent outside the AS 101 using, for example, BGP.

In some example embodiments, the ABR 121 may generate a message 129. Some example embodiments may include the ABR 121 using the routing summary information and reachability information provided by the LSA 116 to generate the message 129. In some example embodiments, this message 129 may be used to put routers receiving the message 129 on notice as to which nodes outside Area-3 133 are reachable or unreachable. For example, upon receiving the message 129, the PE 122 floods the message 129 onto the PE 123, 124, and 125 resulting in an update of each PE's respective RIB, and possibly the FIB, to the effect that routers 114 and 110 are unreachable. In some example cases, the updating of the RIB causes other interested control entities to be notified.

Figure 2:
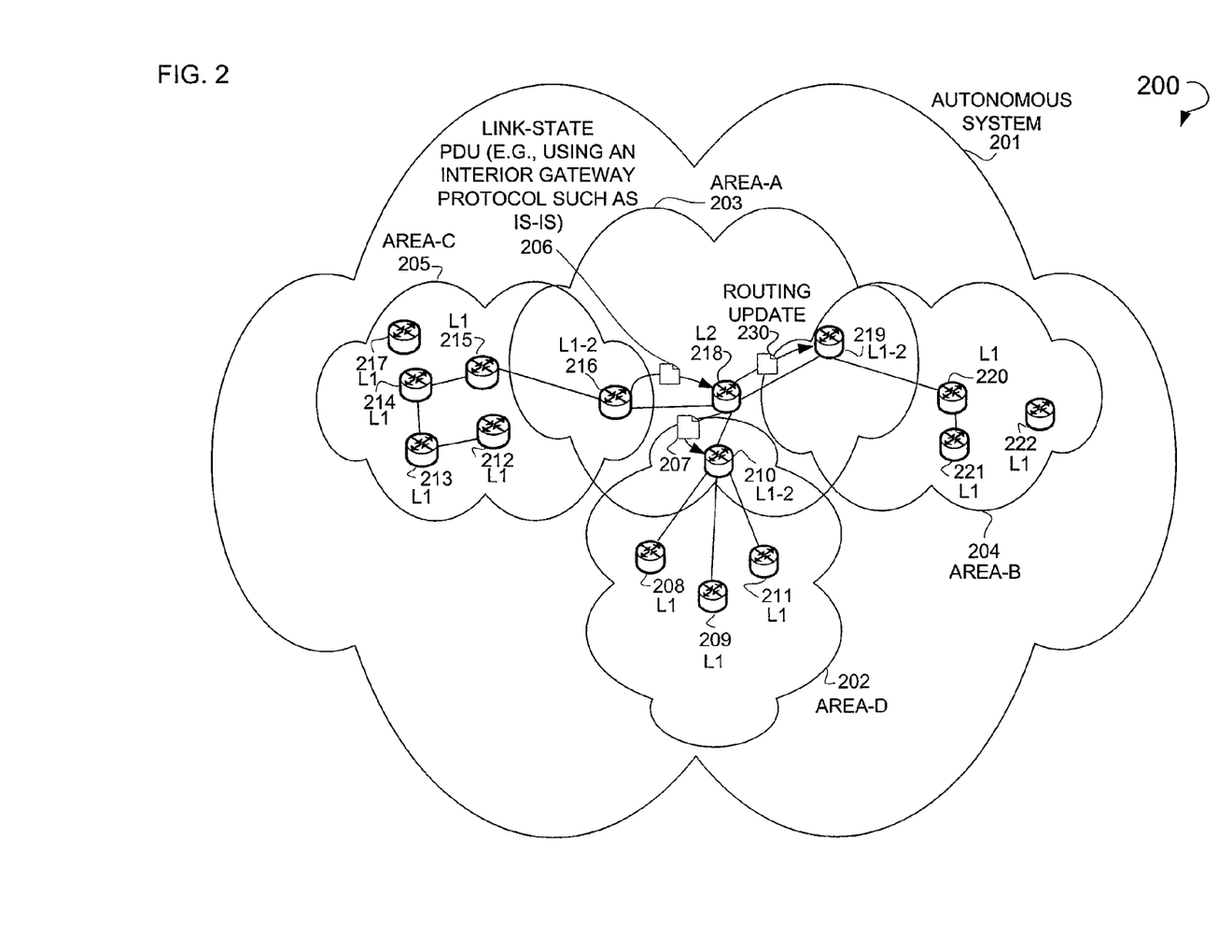
FIG. 2 is a diagram of a network, in accordance with an example embodiment, including multiple areas within an AS, utilizing the IS-IS protocol.

FIG. 2 is a diagram of an example network 200 including an AS 201 utilizing the IS-IS protocol. FIG. 2 shows a system 200 including an AS 201. Included within the AS 201 are a number of areas, such as Area-A 203, Area-B 204, Area-C 205, and Area-D 202. An area may be those defined under an IGP such as the IS-IS protocol. As defined by the IS-IS protocol, Area-A 203 is a level-2 area, while Area-B 204, Area-C 205, and Area-D 202 are all level-1 areas. Included within each one of these Areas 202, 203, 204, and 205, is one or more routers (e.g., nodes), wherein each of these one or more routers may be a level-1 or intra-area router, a level-2 or inter-area router, or a level-1-2 router that is both and an intra- and inter-area router. Each of these routers may be linked via a physical or logical connection. Shown in Area-C 205 is a plurality of routers. For example, a level-1 router 212 is linked to another level-1 router 213. Further, a level-1 router 214 is linked to a level-1 router 215. This router 215 linked to a router 216 that is a level-1-2 router. This router 216 serves as a gateway from Area-C 205 to other areas, such as, for example, Area-A 203. Further, this router 216 may utilize an IGP protocol, such as IS-IS, to transmit a link-state PDU 206 from the Area-C 205 to the Area-A 203.

This link-state PDU 206 includes both routing summary and reachability information. The routing summary and reachability information may be obtained from the routers 212-215. Further, this link-state PDU 206 may be transmitted to, for example, a level-1-2 router or transmitted directly to, for example, a level-2 router. Here, for example, this router 216 transmits the link-state PDU 206 to the router 218. This router 218 resides in the Area-A 203.

Also shown in FIG. 2 is an Area-B 204 including a number of routers. For example, a level-1 router, in the form of router 221, is linked to a level-1 router in the form of router 220. This router 220 is, in turn, linked to a router 219 that is a level-1-2 router. Also shown is an inactive level-1 router 222. In some example embodiments, this router 219 may receive a routing update 230 from the router 218. This routing update 230 may include routing summary and reachability information taken from the link-state PDU 206. In certain example embodiments, the router 218 may, in effect, flood the Area-B 204, and the routers associated with this Area-B 204, with routing updates such as the routing update 230.

In some examples, upon receiving the link-state PDU 206, the router 218 may update its RIB and FIB to reflect information extracted from the link-state PDU 206. Similarly, router 219 may update its RIB and FIB to reflect the information extracted form the routing update 230. For example, this information may indicate that router 217 is inactive. In particular, router 219 may use the summarized information to update its FIB, while passing an indication that node 217 is inactive to other control plane entities including possibly LDP, RSVP-TE, PIM, and BGP. As will be more fully illustrated below, this information may then be provided to other PEs existing outside of the AS 201.

In some example embodiments, the existence of one or more inactive routers is common to both Area-C 205 and Area-B 204. For example, in Area-C 205, a router 217 is shown that is not linked to any other router included in Area-C 205. This router 217 may be determined to be inactive by the router 216. Also shown in Area-B 204 is a level-1 router 222 that is not linked to any other router included in Area-B 204. In some example embodiments, the level-2 router 218, upon receiving the link-state PDU 206, may generate a message 207. This message 207 may be transmitted by, for example, the router 218, to be received by a level-1-2 router 210 that resides within the Area-D 202. Linked to this level-1-2 router 210 may be, for example, a level-1 router 208, a level-1 router 209, and a level-1 router 211. In certain example embodiments, message 207 may include information in the form of routing summary information and reachability information relating to routers included within Area-A 203, Area-B 204, or Area-C 205. This information may be used by the router (e.g., level-1-2 router 210) receiving the information to update its respective RIB, and possibly the FIB, to the effect that router 217 is unreachable. In some example cases, the updating of the RIB causes other interested control entities to be notified.

Figure 3:
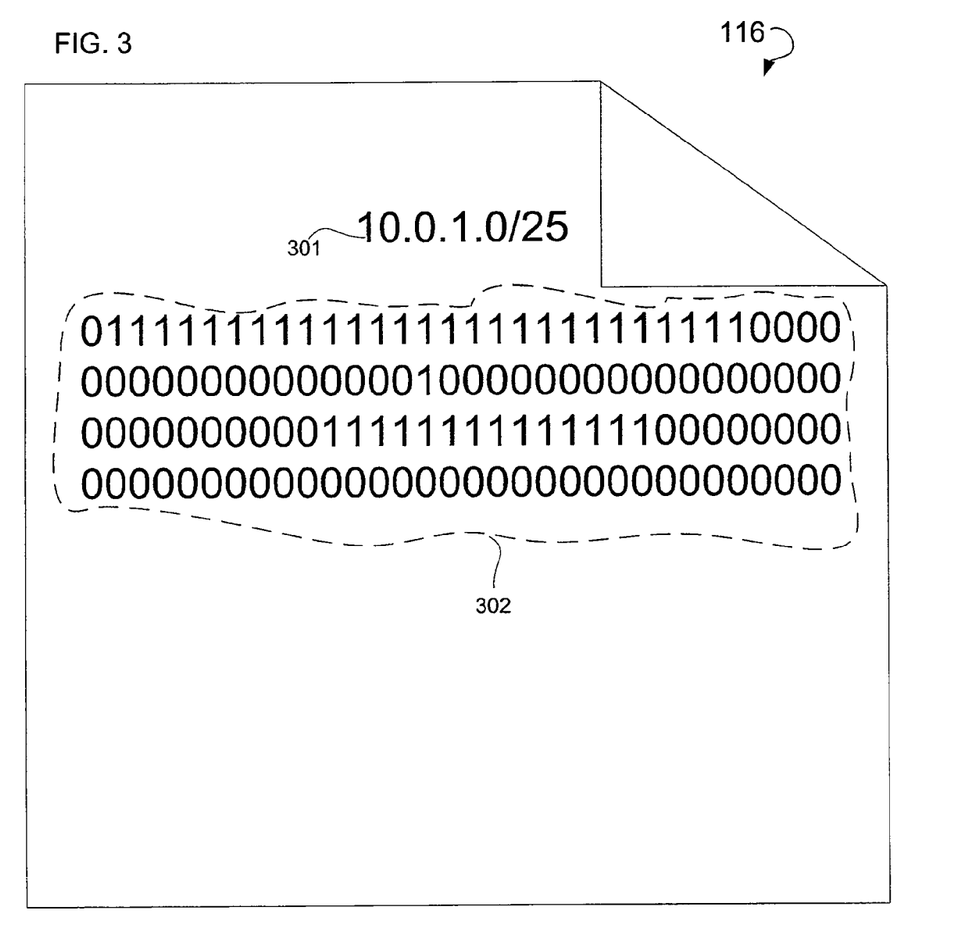
FIG. 3 is a diagram of a Link-State Advertisement (LSA), in accordance with an example embodiment, including a routing summary and reachability information.

FIG. 3 is a diagram of an example LSA 116 including, for example, a routing summary 301 and reachability information 302. In some example embodiments, the link-state PDU 206 may include a routing summary 301 and reachability information 302. Further, in some example embodiments, the routing updates 131 and 230 may include the routing summary 301 and reachability information 302. Collectively, the LSA 116, link-state PDU 206, routing update 131, and routing update 230 may be referenced as a link-state status unit. The routing summary 301 is written utilizing, for example, Classless Inter-Domain Routing (CIDR) notation, such that a prefix is illustrated along with an address space value, which here is represented as /25 bits. With regard to the reachability information 302, a matrix is illustrated including a number of bit values, wherein each of these bit values represents a reachable address when paired with the routing summary 301. In certain example embodiments, a flagged bit value set to "1" within the reachability information 302 may represent a reachable address for a particular node (e.g., a router) that resides as a part of, for example, an area (e.g., Area-1 104, Area-0 103, Area-2 105, Area-A 203, Area-B 204, and/or Area-C 205). In certain other example embodiments, a flagged bit value within this reachability information 302 may be, for example, a bit value set to "0." The generation of this reachability information relative to a particular address space will be more fully discussed below.

Figure 4:
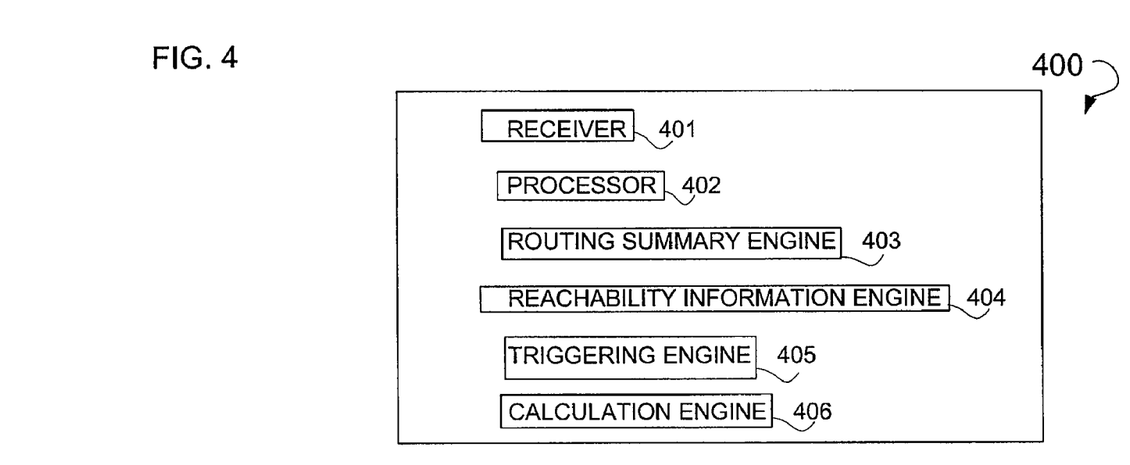
FIG. 4 is a block diagram of a router, in accordance with an example embodiment, such as an Area Border Router (ABR).

FIG. 4 is a block diagram 400 of an example network device, such as the ABR 120, and some of the various blocks of functionality associated therewith. These blocks may represent blocks of functionality implemented in hardware, firmware, or software. Shown is a receiver 401, processor 402, routing summary engine 403, reachability information engine 404, triggering engine 405, and calculation engine 406. Illustrated is a receiver 401 to receive connectivity data for at least one network device, the connectivity data illustrating a connection to the at least one network device within an area. A processor 402 is shown to process the connectivity data to obtain a routing update for distribution to another network device outside the area. Distribute may include transmitting using a protocol such as an LSA. A routing summary engine 403 is shown to include a routing summary in the routing update, the routing summary including an address prefix. A reachability information engine 404 is shown to include reachability information in the routing update, the reachability information including an address for the at least one network device. A triggering engine 405 is shown to trigger the processing of the connectivity data to distribute the routing update to the network device outside the area by receiving the connectivity data. In some example embodiments, the routing update includes link-state data. A calculation engine 406 is shown to calculate the reachability information by determining a difference between an available address space, indicated by the address prefix, and a currently reachable address. A currently reachable address may be an address for which there exists a physical or logic connection from one network device to another network device. In some example embodiments, the reachability information is encoded in a bit-vector. Some example embodiments may include, the routing summary and the reachability information included in a protocol including at least one of an OSPF protocol, IS-IS protocol or BGP.

Figure 5:
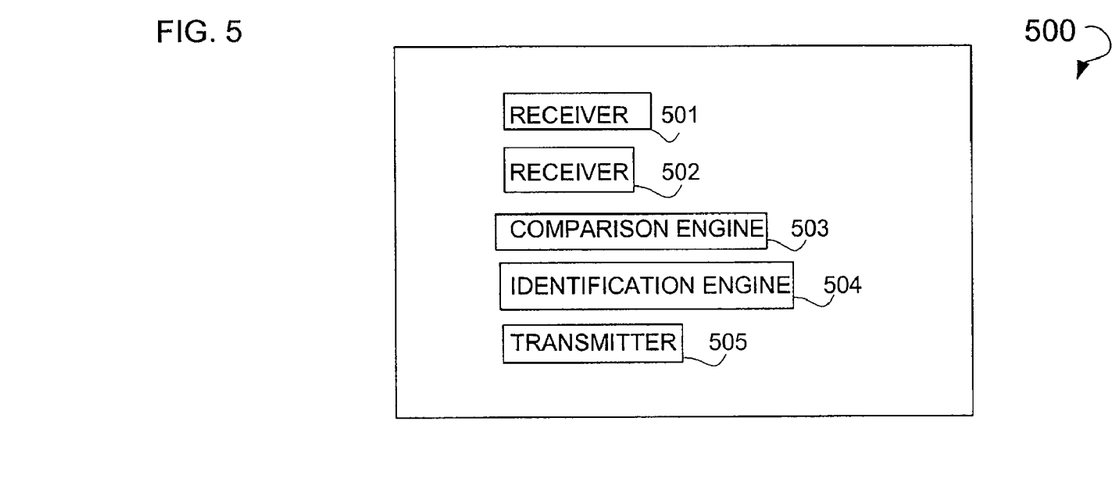
FIG. 5 is a block diagram of a router, in accordance with an example embodiment, such as a router used to distribute a routing update.

FIG. 5 is a block diagram 500 of an example network device, such as the ABR 120, and some of the various blocks of functionality associated therewith. These blocks may represent blocks of functionality implemented in hardware, firmware, or even software. Shown are receivers 501-502, comparison engine 503, identification engine 504 and a transmitter 505. Illustrated is a receiver 501 to receive a first routing update that includes a first routing summary and first reachability information for at least one network device. A receiver 502 is shown to receive a second routing update that includes a second routing summary and second reachability information for the at least one network device. A comparison engine 503 is shown to compare the first reachability information with the second reachability information. An identification engine 504 is shown to identify a change between the first reachability information and the second reachability information based on the comparing, the change indicating a change in reachability for the at least one network device. A transmitter 505 is shown to transmit to a client application reachability information including at least one of the first reachability information, or the second reachability information. A client application may be an application that is serviced by a network device. In some example embodiments, the client application uses BGP to use the reachability information to make a next hop selection.

Figure 6:
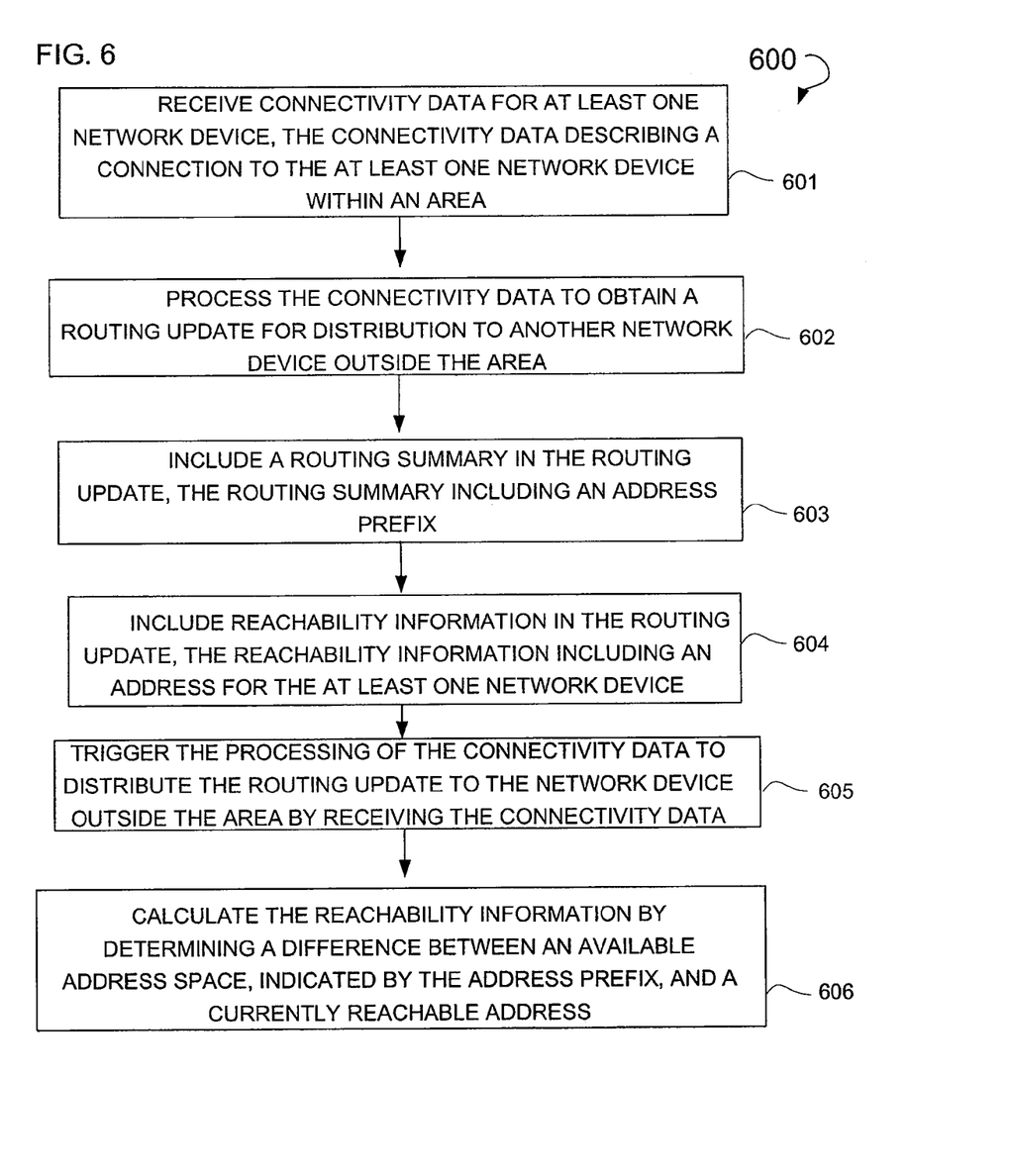
FIG. 6 is a flow chart illustrating a method, in accordance with an example embodiment, used to generate an LSA including a link-state summary and reachability information.

FIG. 6 is a flow chart illustrating an example method 600 used to generate an LSA or PDU including a link-state summary and reachability information. Shown are various operations 601-606 that may reside as part of, for example, an ABR 120, or other suitable network device. In some example embodiments, an operation 601 is executed to receive connectivity data for at least one network device, the connectivity data illustrating a connection to the at least one network device within an area. An operation 602 may be executed to process the connectivity data to obtain a routing update for distribution to another network device outside the area. An operation 603 may be executed to include a routing summary in the routing update, the routing summary including an address prefix. An operation 604 may be executed to include reachability information in the routing update, the reachability information including an address for the at least one network device. An operation 605 may be executed to trigger the processing of the connectivity data to distribute the routing update to the network device outside the area by receiving the connectivity data. In some example embodiments, the routing update includes link-state data. An operation 606 may be executed to calculate the reachability information by determining a difference between an available address space, indicated by the address prefix, and a currently reachable address. In some example embodiments, the reachability information is encoded in a bit-vector. Further, in some example embodiments, the routing summary and the reachability information is included in a protocol including at least one of the OSPF protocol, the IS-IS protocol or BGP.

Figure 7:
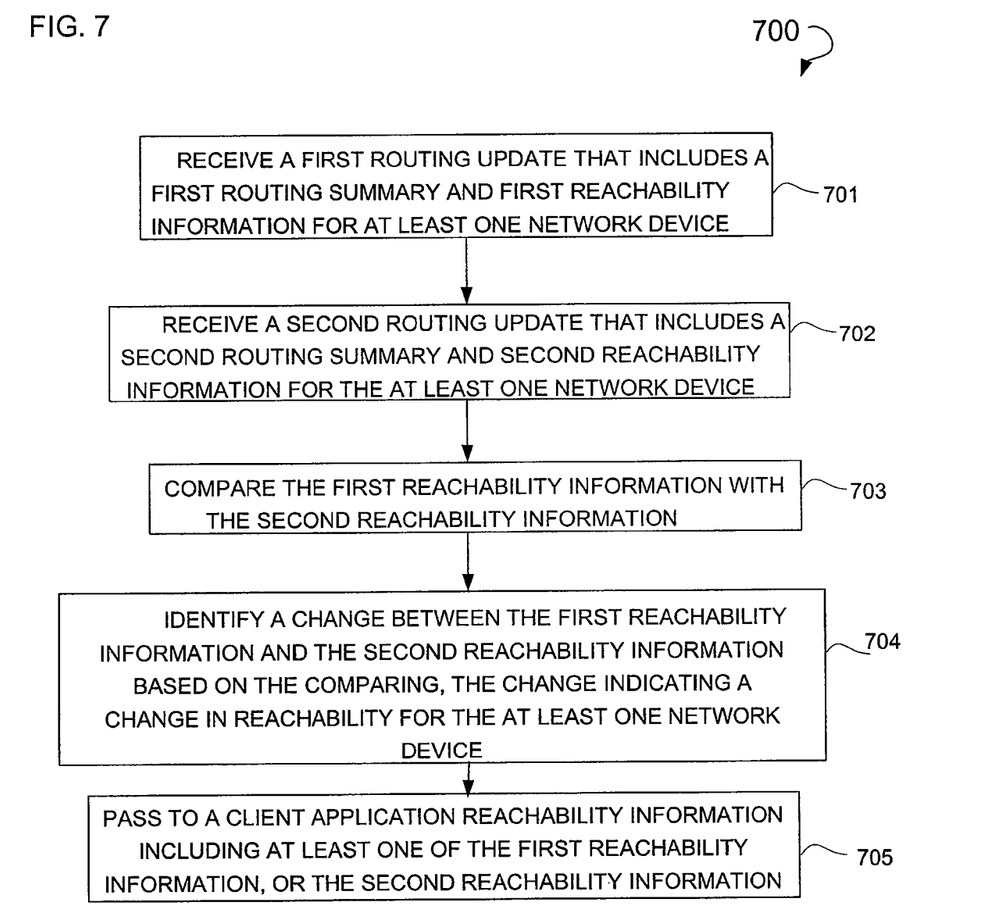
FIG. 7 is a flow chart illustrating a method, in accordance with an example embodiment, used to generate a routing update including a link-state summary and reachability information.

FIG. 7 is a flow chart illustrating an example method 700 for generating a routing update including a link-state summary and reachability information. Shown are operations 701-705 that may reside as part of the ABR 120, or other suitable network device. Illustrated is an operation 701 that, when executed, receives a first routing update that includes a first routing summary and first reachability information for at least one network device. An operation 702 is shown that, when executed, receives a second routing update that includes a second routing summary and second reachability information for the at least one network device. An operation 703 is shown that, when executed, compares the first reachability information with the second reachability information. An operation 704 is shown, that when executed, identifies a change between the first reachability information and the second reachability information based on the comparing, the change indicating a change in reachability for the at least one network device. An operation 705 is shown that, when executed, passes to a client application reachability information including at least one of the first reachability information, or the second reachability information. In some example embodiments, the client application uses BGP to use the reachability information to make a next hop selection.

Figure 8:
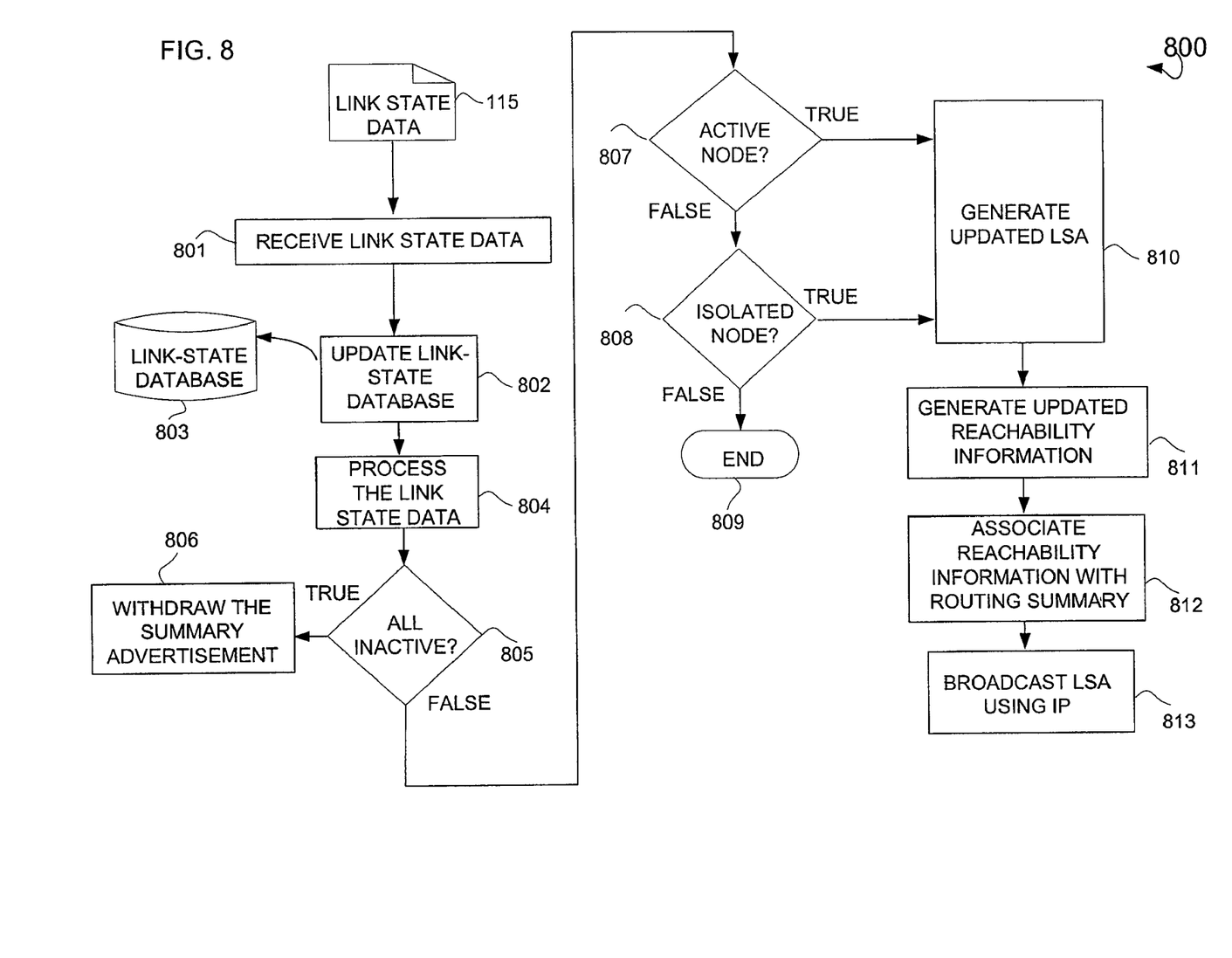
FIG. 8 is a flow chart illustrating a method, in accordance with an example embodiment, executed by an ABR used to generate a link-state advertisement or link-state Protocol Data Unit (PDU) including routing summary data and reachability information for a particular area.

FIG. 8 is a flow chart illustrating an example method 800 for generating a link-state advertisement or link-state PDU including routing summary data and reachability information for a particular area. Illustrated are various operations and databases 801-813 that may reside as part of, for example, the ABR 120 or even the level-2 router 216. Shown is the link-state data 115 that is received through the execution of an operation 801. Once received, an operation 802 may be executed that updates the link-state database 803 with the link-state data 115. An operation 804 may be executed that processes the link-state data such that decisional operations 805, 807, and 808 are executed. With regard to the decisional operation 805, a determination is made as to whether all nodes in a previously advertised summary are inactive. In cases where decisional operation 805 evaluates to "true," a further operation 806 is executed that withdraws the summary advertisement from the link-state database 803. In cases where decisional operation 805 evaluates to "false," a further decisional operation 807 is executed that determines whether a node is active. In cases where decisional operation 807 evaluates to "true," a further operation 810 is executed that generates an updated LSA. In cases where decisional operation 807 evaluates to "false," a further decisional operation 808 is executed. This decisional operation 808 determines whether a node is isolated. Where decisional operation 808 evaluates to "true," the previously illustrated operation 810 may be executed. In cases where decisional operation 808 evaluates to "false," a termination condition 809 may be executed. Where operation 810 is executed, a further operation 811 may be executed. This operation 811 generates updated reachability information. An operation 812 may also be executed that associates the reachability information and the routing summary. In some example embodiments, an operation 813 may be executed that broadcasts an LSA over some other type of network protocol, such as an IP.

In some example embodiments, these various decisional operations 805, 807, and 808 may be organized into different permutations, such that, for example, decisional operation 808 may be first executed, a decisional operation 807 may be executed second, and the decisional operation 805 may be executed third. In some example embodiments, only one or two of these decisional operations 805, 807, and 808 may be utilized.

Figure 9:
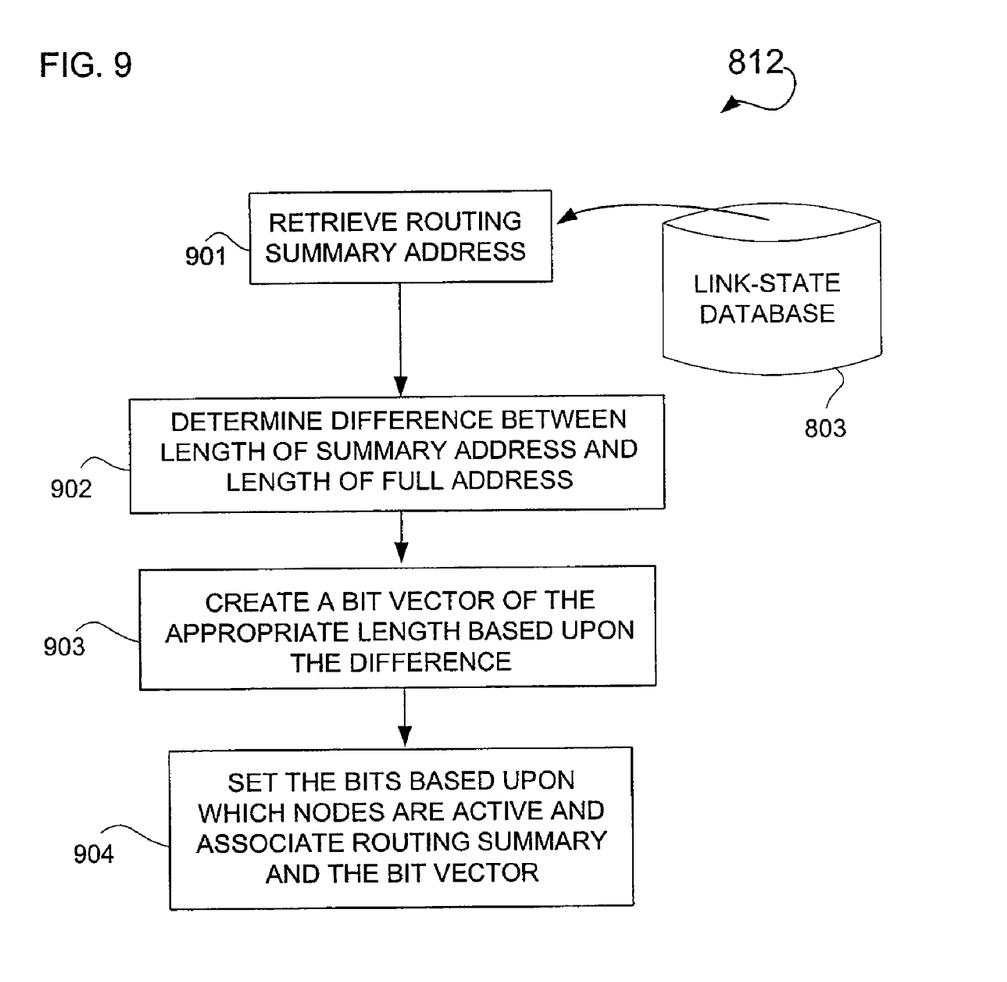
FIG. 9 is a flow chart illustrating a method, in accordance with an example embodiment, for associating the reachability information and the routing summary.

FIG. 9 is a flow chart illustrating an example method for executing operation 812. Illustrated are various operations 901-904. When executed, operation 901 retrieves routing summary information (e.g., addresses) from the link-state data base 803. Next, an operation 902 may be executed that determines the difference between the summary address length and the full address length. Based upon this difference, an operation 903 may be executed that creates a bit-vector of the appropriate length. Further, an operation 904 may be executed that sets the bits based upon which nodes are active, and associates the routing summary and bit-vector (e.g., reachability information).

In some example embodiments, the calculation of a difference between the retrieved summary address and the available address space for an area, or other predefined domain, may be determined in the following manner. For example, given a routing summary of /25 bit, and an available address space of /32 bits, there is a difference of seven bits that allows for $2^7$ different addresses covered by the summary. These $2^7$ different addresses may be currently reachable addresses. A bit-vector of $2^7$ or 128 bits may be created to represent these currently reachable addresses. In some example cases, available address space may be a maximum number value that may be accommodated by a particular memory space, or protocol format. In some other example embodiments, some other suitable mathematical function may be implemented to calculate the reachability information.

Figure 10:
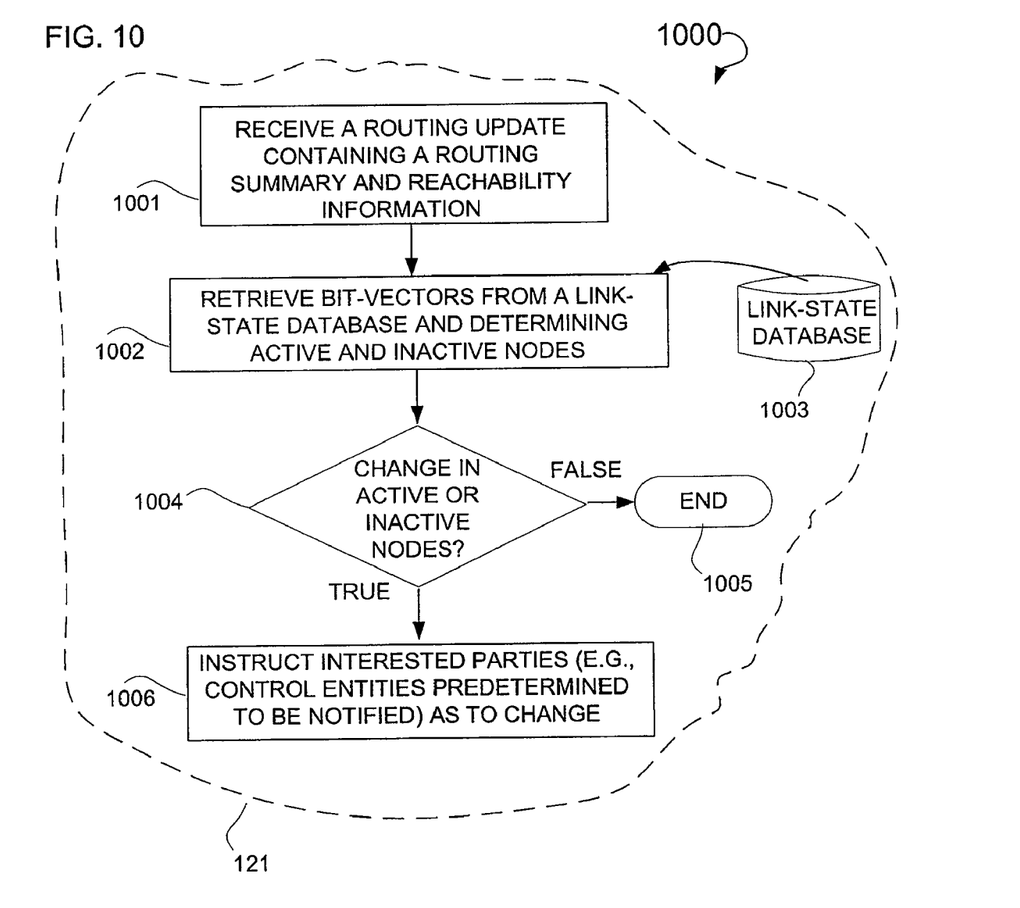
FIG. 10 is a flow chart illustrating a method, in accordance with an example embodiment, for determining whether a linked device should be notified of change of a node.

FIG. 10 is a flow chart illustrating an example method 1000 used to determine whether linked devices may be notified of the change of a node from active to inactive or vice-versa. Shown are a number of operations and databases 1001-1106 that, in some example embodiments, reside on the PE 124. In some example embodiments, these various operations databases may reside as part of some other suitable node. Illustrated is an operation 1001 that, when executed, receives a routing update including a routing summary and reachability information. An operation 1002 may be executed that retrieves a bit-vector from a link-state data base and determines active and inactive nodes by comparing the bit-vector included in the routing update and the bit-vector existing in the link-state database 1003. A decisional operation 1004 may be executed to determine whether these bit-vectors differ. In cases where decisional operation 1004 evaluates to "false," a termination condition 1005 may be executed. In cases where decisional operation 1004 evaluates to "true," a further operation 1006 may be executed. When executed, operation 1006 may instruct interested parties as to the change in active and inactive nodes. These interested parties may be nodes, control entities, or other suitable devices identified via a network address value. The process of identifying these interested parties may be by way of a manual configuration of the ABR 121, or through some automated process.

In some example embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data that cause a general-purpose computer system or special-purpose computer system to perform a certain function or group of functions. The computer-executable or computer-readable instructions may be, for example, binaries, intermediate format instructions such as assembly language, or even source code.

As shown herein, and in the following claims, a computer system is defined as one or more software modules, one or more hardware modules, or combinations thereof, that work together to perform operations on electronic data. For example, the definition of computer system includes the hardware modules of a Personal Computer (PC), as well as software modules such as the operating system of the PC. The physical layout of the modules is not important. A computer system may include one or more computers coupled via a network. Likewise, a computer system may include a single physical device where internal modules (e.g., a processor and memory) work together to perform operations on electronic data.

In some example embodiments, the method and apparatus may be practiced in network computing environments with many types of computer system configurations, including hubs, routers, wireless Access Points (APs), wireless stations, multi-processor systems, microprocessor-based or programmable consumer electronics, network PCs, minicomputers, mainframe computers, and the like. The method and apparatus can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices.

Figure 11:
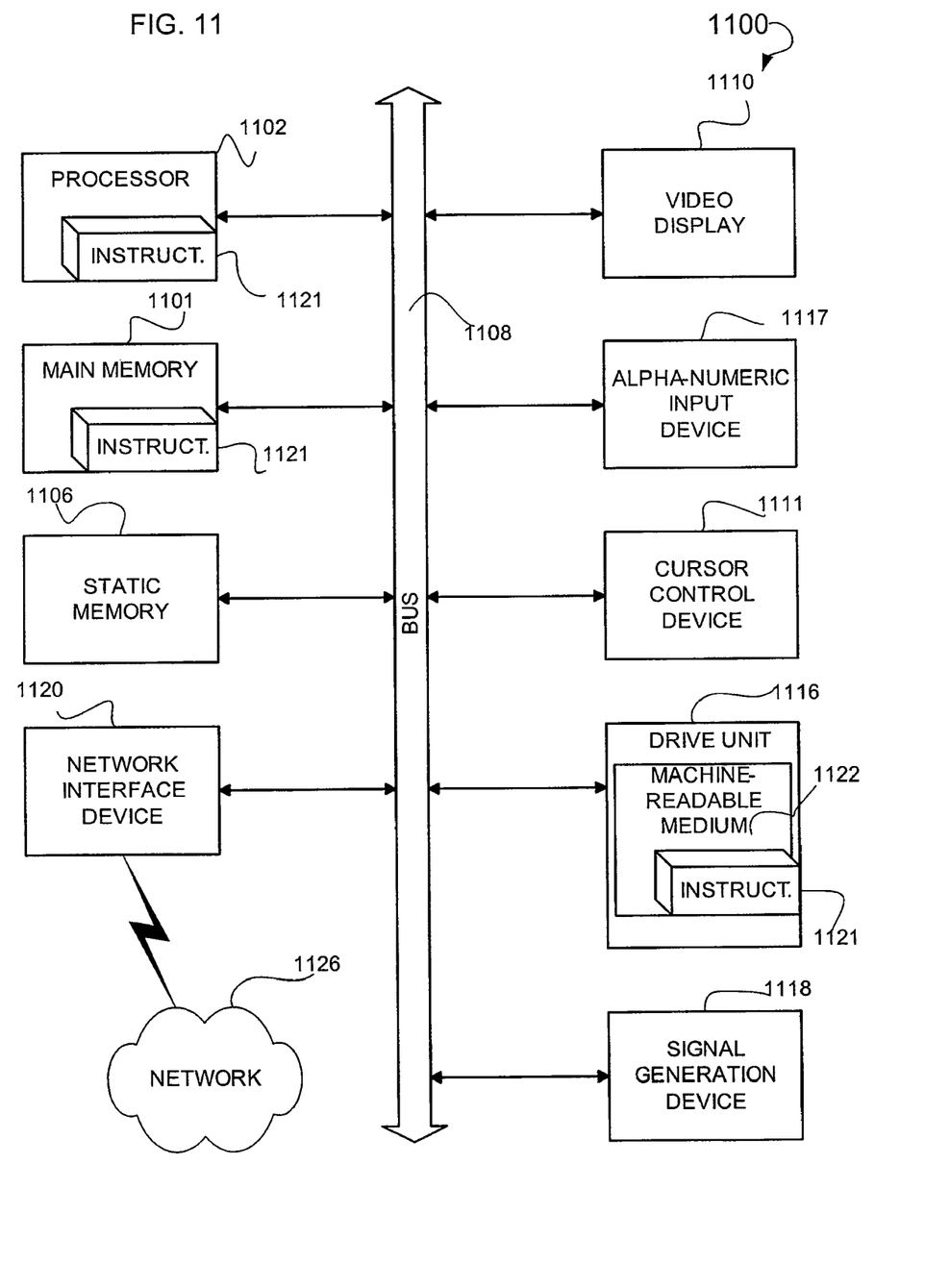
FIG. 11 shows a diagrammatic representation of a machine, in accordance with an example embodiment, in the form of a computer system.

FIG. 11 shows a diagrammatic representation of a machine in the example form of a computer system 1100 within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a PC, a web appliance, a network router, switch, or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a Central Processing Unit (CPU), a Graphics Processing Unit (GPU) or both), a main memory 1101, and a static memory 1106, which communicate with each other via a bus 1108. The computer system 1100 may further include a video display unit 1110 (e.g., a Liquid Crystal Display (LCD) or a Cathode Ray Tube (CRT)). The computer system 1100 also includes an alpha-numeric input device 1117 (e.g., a keyboard), a User Interface (UI) cursor controller 1111 (e.g., a mouse), a disk drive unit 1116, a signal generation device 1118 (e.g., a speaker) and a network interface device (e.g., a transmitter) 1120.

The disk drive unit 1116 includes a machine-readable medium 1122 on which is stored one or more sets of instructions and data structures (e.g., software) 1121 embodying or utilized by any one or more of the methodologies or functions illustrated herein. The software may also reside, completely or at least partially, within the main memory 1101 and/or within the processor 1102 during execution thereof by the computer system 1100, with the main memory 1101 and the processor 1102 also constituting machine-readable media.

The instructions 1121 may further be transmitted or received over a network 1126 via the network interface device 1120 using any one of a number of well-known transfer protocols (e.g., Hyper-Text Transfer Protocol (HTTP), Secure Hyper Text Transfer Protocol (HTTPS)).

While the machine-readable medium 1122 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that cause the machine to perform anyone or more of the methodologies of the present method and apparatus, or that is capable of storing, encoding, or carrying data structures utilized by or associated with such a set of instructions. The term "machine-readable medium" shall accordingly be taken to include, but not be limited to, solid-state memories, optical media and magnetic media.

In some example embodiments, routing information may include not only a routing summary, but also detailed reachability information. In some examples, the reachability information is not used to resolve routes. Specifically, the routing decisions are made solely on the basis of the summarized route. However, in some examples, the detailed reachability information is distributed via IGP such that IGP may be made available to the BGP route selection and/or other interested applications.

In some example embodiments, IGPs such as OSPF and IS-IS advertise routing/reachability information in link-state packets within a routing domain. For example, these protocols make no distinction between routing and reachability. Other example embodiments may further break down routing domains into subsets called areas. For example, in order to increase the scalability of routing, routes may be summarized when they are advertised into other areas.

In some example embodiments, various control plane elements require host reachability information (e.g., for PE loopback addresses) either for corrective actions or to speed convergence. Addresses or loopbacks may be the addresses of nodes in a network, and may include IP addresses, Network Service Access Point (NSAP) based addresses, or some other suitable address used to identify a node in a network. The level of detail provided by host reachability information, however, may not be needed in the data plane. In other examples, however, this host reachability information (e.g., reachability information) may be utilized for the purpose of enhancing network convergence. For example, among the control plane elements that could benefit from detailed host-reachability information are the LDP, Traffic Engineering (TE) Automesh, PIM, BGP next-hop tracking, and BGP Prefix Independent Convergence (PIC).

In some example embodiments, Service Providers (SPs) offering Multi Protocol Label Switching (MPLS)-Layer 3 Virtual Private Networks (VPNs), Layer 2 VPNs, and Pseudo Wires (PWs) may require a full mesh of label switch paths between all PEs. Some examples may require that LDP be used to set a Label Switched Path (LSP) based on the information in a RIB. In some examples, the loopback address of a PE is leaked into all other areas. In other examples, an SP would like to be able to summarize this routing information.

In some example embodiments, by distributing reachability information along with a summarized route (referenced herein as a link-state summary or routing summary), some type of label distribution protocol could receive notifications from the RIB (e.g., the control plane) of specific host-routes (e.g., PE) and use this to distribute labels. These labels could then be routed toward the summarized route.

Some example embodiments may include a TE Automesh implementation. In some example cases, MPLS routers may be configured to establish traffic engineering tunnels to a list of PEs. For example, by adding detailed reachability information to the routing summary, this may allow signalling to be done if the remote PE is reachable.

Some example embodiments may include a PIM implementation. In some examples, PIM depends on the IGP reachability to the source of a (S, G) state to determine its Reverse Path Forwarding (RPF) interface. Certain router operating systems, such as the Internetwork Operating System (IOS) and IOS-XR, support the same event-driven mechanism. When PIM installs an (S, G) state for the first time, the PIM registers with the RIB for being notified of any route change to S. Later on, if the route to S changes, RIB immediately sends a notification to PIM.

Some example embodiments may include the use of BGP. In an example, BGP advertises routes that are external to the domain (e.g., the AS) by associating them with a BGP next-hop address that is known within a domain. In some examples, multiple next-hops are available to reach a particular prefix. If a prefix becomes unreachable, then BGP may withdraw the route. Such withdrawals take time. In particular, if the advertising router goes down, the withdrawal may be delayed until the BGP-TCP session times out. In order to speed convergence, a router may employ a technique called next-hop tracking. In next-hop tracking, the reachability of the BGP next-hop is tracked. If a next-hop becomes unreachable, BGP route selection is run. External routes that are reachable through a known alternative next-hop are then installed. In an example embodiment, IGP routes may be summarized while at the same time distributing the detailed reachability information needed for next-hop tracking.

Some example embodiments may include a next-hop tracking within the BGP PIC context. In this example embodiment, addresses with a length of /32 bits may be necessary at the edges of the network in order to perform BGP PIC edge functionality. This edge functionality may include a data plane protection technique based on the hierarchical organization of a FIB tree. Upon deletion of a root of the tree (e.g., an IGP route to a BGP nhop), the tree is immediately re-parented onto a valid parent (e.g., another valid BGP nhop for all the leaves of this tree). In some example embodiments, this re-parenting does not depend on the number of terminal leaves (e.g., number of BGP prefixes) in the tree. In some example embodiments, a BGP speaker (e.g., a broadcasting router such as a PE) may request its link-state IGP to determine the availability of a device within a domain. This availability may be denoted by, for example, turning on a bit in the reachability stream of a summarized route as the route may appear in a /32 RIB and FIB route, where the related bit matches to an installed BGP nhop. If the reachability of this host later changes, the related /32 route would need to be removed from both the RIB and FIB. In some example embodiments, the use of reachability information in the BGP PIC case becomes a matter of compressing routing information, such as to install the /32 addresses in the FIB. This compression may even, for example, be applied in the case of BGP PIC, when tunnelling is used edge-to-edge. Further, in some example embodiments using MPLS layer 3 VPNs, a core-only router may not need to install the PE host-routes in the FIB. Rather, the PE host routes may be needed in the control plane to allow the establishment of LSP to the PE.

Some example embodiments may include the use of the routing summary by a forwarding system (e.g., data plane), and the detailed reachability information to be used by a control system (e.g., control plane). Further, this detailed reachability information may be represented by using some type of compact encoding regime. In some examples, host reachability information is carried via a bit-vector. For example, an area-0 may have 10.0.1.0/25 assigned as its address range, wherein routes with loopbacks exist within this area-0 are as follows:

```
10.0.1.1-10.0.1.27
10.0.1.46
10.0.1.74-10.0.1.87
```

In addition to this address range, detailed host reachability information may be provided such that an encoding regime would advertise a routing summary of 10.0.1.0/25, with associated reachability information in the form of a 128 bit-vector such as:

```
         0         1         2         3
01234567890123456789012345678901
01111111111111111111111111110000
00000000000001000000000000000000
00000000001111111111111100000000
00000000000000000000000000000000
```

In some example embodiments, this reachability information reflects the reachability information for some, or all, of the nodes within a particular area (e.g., a predefined domain) and the address space associated therewith. As shown above, in some example embodiments, a bit value is flagged (e.g., set to 1) to denote an existing, and thus reachable, node. In some example embodiments, a bit value may be flagged by setting the bit value to 0 to denote an existing, and hence reachable, node. In an example embodiment, the reachability information can be made available to interested control plane elements such as, for example, BGP next-hop tracking, PIM, LDP, and TE Automesh.

In a further example embodiment, the detailed reachability information may be used to update routing, which may have value from a convergence standpoint. In regard to convergence, LSAs generated from one area (e.g., an area-1) into another (e.g., an area-0) may be reduced. This reduction, in some example embodiments, may be offset by compression costs.

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the system and method should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving connectivity data for at least one network device, said connectivity data describing a connection to said at least one network device within an area;
processing said connectivity data to obtain a routing update for distribution to a router outside said area to update routing information stored by the router to route network traffic;
including a routing summary in said routing update, said routing summary including an address prefix that indicates an associated network address space;
including in said routing update reachability information for a plurality of network addresses within said network address space, said reachability information being encoded and being decodable by combination thereof with said routing summary, to identify within said network address space one or more unreachable network addresses and one or more reachable network addresses, said one or more reachable network addresses including an address for said at least one network device; and
distributing the routing update to the router outside said area.

2. The method of claim 1, further comprising triggering said processing of said connectivity data to distribute said routing update to said network device outside said area when said connectivity data is received.

3. The method of claim 1, wherein said routing update includes link-state data.

4. The method of claim 1, further comprising calculating said reachability information by determining a difference between an available address space, indicated by said address prefix, and a currently reachable address.

5. The method of claim 1, wherein said reachability information is encoded in a bit-vector.

6. The method of claim 5, wherein the bit-vector has a length equal to a total number of network addresses associated with said network address space of a prefix, each bit of the bit-vector being associated with a respective one of the network addresses of said network address space, and each bit of the bit vector providing a binary indication of whether the associated network address is reachable or unreachable.

7. The method of claim 1, wherein said routing summary and said reachability information is included in a protocol including at least one of an Open Shortest Path First (OSPF) protocol, Intermediate System to Intermediate System (IS-IS) protocol or a Border Gateway Protocol (BGP).

8. The method of claim 1, wherein said reachability information is combinable with said routing summary to identify reachability information with respect to all network addresses within said network address space.

9. A method comprising:
receiving a first routing update that includes
a first routing summary that indicates a first network address space, and
first reachability information for a plurality of network addresses within the first network address space, the first reachability information being encoded and being decodable by combination thereof with the first routing summary to indicate within the first network address space one or more reachable network addresses and one or more unreachable network addresses;
receiving a second routing update that includes
a second routing summary that indicates a second network address space, and
second reachability information for a plurality of network addresses within the second network address space, the second reachability information being encoded and being decodable by combination thereof with the second routing summary to indicate within the second network address space one or more reachable network addresses and one or more unreachable network addresses;
comparing said first reachability information with said second reachability information; and
identifying a change between said first reachability information and said second reachability information based on said comparing, said change indicating a change in reachability for at least one network device.

10. The method of claim 9, further comprising passing to a client application reachability information including at least one of said first reachability information, or said second reachability information.

11. The method of claim 10, wherein said client application uses a Border Gateway Protocol (BGP) to use said reachability information to make a next hop selection.

12. A network device comprising:
a receiver to receive connectivity data for at least one network device, said connectivity data describing a connection to said at least one network device within an area;
a processor to process said connectivity data to obtain a routing update for distribution to a router outside said area to update routing information stored by the router to route network traffic;
a routing summary engine to include a routing summary in said routing update, said routing summary to include an address prefix associated with a network address space;
a reachability information engine to include in said routing update reachability information for a plurality of network addresses within said network address space, said reachability information being encoded and being decodable by combination thereof with said routing summary, to identify within said network address space one or more unreachable network addresses and one or more reachable network addresses, the plurality of network addresses including an address for said at least one network device; and
a transmitter to distribute the routing update to the router outside said area.

13. The network device of claim 12, further comprising a triggering engine to trigger said processing of said connectivity data to distribute said routing update to said network device outside said area when said connectivity data is received.

14. The network device of claim 12, wherein said routing update includes link-state data.

15. The network device of claim 12, further comprising a calculation engine to calculate said reachability information by determining a difference between an available address space, indicated by said address prefix, and a currently reachable address.

16. The network device of claim 12, wherein said reachability information is encoded in a bit-vector.

17. The network device of claim 12, wherein said routing summary and said reachability information is included in a protocol that includes at least one of an Open Shortest Path First (OSPF) protocol, Intermediate System to Intermediate System (IS-IS) protocol or a Border Gateway Protocol (BGP).

18. The network device of claim 12, wherein said reachability information is combinable with the address prefix to identify reachability information with respect to all network addresses within said network address space of the address prefix.

19. A network device comprising:
a receiver to receive:
  a first routing update that includes
    a first routing summary that indicates a first network address space, and
    first reachability information for a plurality of network addresses within the first network address space, the first reachability information being encoded and being decodable by combination thereof with the first routing summary to indicate within the first network address space one or more reachable network addresses, and one or more unreachable network address addresses; and
  a second routing update that includes
    a second routing summary that indicates a second network address space, and
    second reachability information for a plurality of network addresses within the second network address space, the second reachability information being encoded and being decodable by combination thereof with the second routing summary to indicate within the second network address space one or more reachable network addresses and one or more unreachable network addresses;
a comparison engine to compare said first reachability information with said second reachability information; and
an identification engine to identify a change between said first reachability information and said second reachability information based on said comparing, said change to indicate a change in reachability for at least one network device.

20. The network device of claim 19, further comprising a transmitter to transmit to a client application reachability information including at least one of said first reachability information, or said second reachability information.

21. The network device of claim 20, wherein said client application uses a Border Gateway Protocol (BGP) to use said reachability information to make a next hop selection.

22. An apparatus comprising:
a receiver to receive connectivity data for at least one network device, said connectivity data describing a connection to said at least one network device within an area;
a processor to process said connectivity data to obtain a routing update for distribution to a router outside said area to update routing information stored by the router to route network traffic;
means for including a routing summary in said routing update, said routing summary including an address prefix associated with a network address space;
means for including in said routing update reachability information for a plurality of network addresses within said network address space, the reachability information being encoded and being decodable by combination thereof with said routing summary, to identify within said network address space one or more unreachable network addresses and one or more reachable network addresses, the plurality of network addresses including an address for said at least one network device; and
means for distributing the routing update to the router outside said area.

23. Logic encoded in one or more non-transitory media for execution and when executed operable to:
receive connectivity data for at least one network device, said connectivity data describing a connection to said at least one network device within an area;
process said connectivity data to obtain a routing update for distribution to a router outside said area to update routing information stored by the router to route network traffic;
include a routing summary in said routing update, said routing summary including an address prefix associated with a network address space;
include in said routing update reachability information for a plurality of network addresses within said network address space, said reachability information being encoded and being decodable by combination thereof with said routing summary, to identify that identifies within said network address space at least one or more unreachable network address addresses and one or more reachable network addresses, said reachability information the plurality of network addresses including an address for said at least one network device; and
distributing the routing update to the router outside said area.

* * * * *

UNITED STATES PATENT AND TRADEMARK OFFICE
CERTIFICATE OF CORRECTION

| | | |
|---|---|---|
| PATENT NO. | : 8,238,338 B2 | Page 1 of 1 |
| APPLICATION NO. | : 12/111336 | |
| DATED | : August 7, 2012 | |
| INVENTOR(S) | : Swallow et al. | |

It is certified that error appears in the above-identified patent and that said Letters Patent is hereby corrected as shown below:

In column 13, line 64, in claim 9, before "addresses", delete "address", therefor In column 15, line 19, in claim 19, before "addresses", delete "address", therefor In column 16, line 40, in claim 23, before "addresses", delete "address", therefor Signed and Sealed this
Twenty-sixth Day of February, 2013

Teresa Stanek Rea
*Acting Director of the United States Patent and Trademark Office*